US007507941B2

(12) United States Patent
Yeh et al.

(10) Patent No.: US 7,507,941 B2
(45) Date of Patent: Mar. 24, 2009

(54) HYBRID MODE SUN-TRACKING APPARATUS HAVING PHOTO SENSOR

(75) Inventors: Hong-Yih Yeh, Sindian (TW); Cheng-Dar Lee, Tainan (TW); Ming-Huei Chen, Bade (TW); Pan-Chih Liu, Taoyuan (TW); Yen-Chang Tzeng, Yonghe (TW)

(73) Assignee: Atomic Energy Council—Institute of Nuclear Energy Research, Taoyuan (TW)

( * ) Notice: Subject to any disclaimer, the term of this patent is extended or adjusted under 35 U.S.C. 154(b) by 248 days.

(21) Appl. No.: 11/518,413

(22) Filed: Sep. 11, 2006

(65) Prior Publication Data

US 2008/0066735 A1 Mar. 20, 2008

(51) Int. Cl.
*F24J 2/38* (2006.01)
*G01C 21/02* (2006.01)

(52) U.S. Cl. .................................... 250/203.4; 126/573

(58) Field of Classification Search ............. 250/203.1, 250/203.3, 203.4, 206.2; 126/573, 576, 600; 136/246, 259; 356/139.01, 141.5
See application file for complete search history.

(56) References Cited

U.S. PATENT DOCUMENTS 4,287,411 A * 9/1981 Beucci .................... 250/203.4
7,157,678 B2 * 1/2007 Maldziunas et al. ...... 250/203.4

* cited by examiner

*Primary Examiner*—Kevin Pyo
(74) *Attorney, Agent, or Firm*—Troxell Law Office, PLLC

(57) ABSTRACT

A sun-tracking apparatus has a photo sensor. The apparatus can precisely track the sun. The apparatus uses two tracking modes for different conditions and weathers. By doing so, a maximum power efficiency is obtained.

16 Claims, 5 Drawing Sheets

HYBRID MODE SUN-TRACKING APPARATUS HAVING PHOTO SENSOR

FIELD OF THE INVENTION

The present invention relates to sun-tracking; more particularly, relates to tracking the sun with low-cost, low electricity consumption, high stability and high precision on controlling.

DESCRIPTION OF THE RELATED ART

Following the development of industries, energies are running out and greenhouse effect is getting worse so that a stable sup ply of energy has become a major concern to the world. Comparing to traditional energies obtained from burning oil or gas and nuclear energy, a solar cell directly transforms solar energy into electricity through photoelectric effect without accompanying with poisonous material, such as carbon dioxide, nitric oxide, sulfur oxide, etc. The solar cell can thus eliminate the needs in oil and provide safe and self-sufficient power source.

A non-concentrating solar cell can be equipped with a sun tracker for an improvement in power generating efficiency for 20~30 percents. But to a concentrating solar cell, the sun tracker is a must or else it can not concentrate on the sun and so can not gene rate power.

The ways the sun tracker tracks on the sun includes photo sensing, sun trajectory and dual modes of photo sensing and sun trajectory. Different ways are used in different applications and different trackers. Up to now, the sun trackers using non-concentrating Si matter are mainly used for solar cells, which are characterized in: (a) mostly utilizing photo sensing; (b) having a tracking precision with in 1 to 3 degrees of angles (c) targeting on tracking the brightest light in the sky; and (d) using a controller of analog circuit.

Ronald P. Corio, etc. announced in 1993 a method for tracking sun by photo sensing, as shown in FIG. 5. The sun tracker comprises a case [41]. Within the case [41], there is a printed circuit board (PCB) [42]. Four side surfaces of the case [41] have photo sensors (CdS) [43] separately deposed in 45 degrees of angle for the east direction, the west direction, the north direction and the south direction to track the sun by the potential difference between the east/west and north/south photo sensors [43]. And a face photo sensor [43] is used for strong sun light. When it is night or sun light is weak, the sun tracking is stopped.

Although the above photo sensors [43] can track the sun, the photo sensors [43] at the east, west, north and south directions are deposed in 45 degrees to the side surfaces, which increases difficulties in fabricating the sun tracker. And its tracking ability may be decreased owing to the accumulating of water or rain. Besides, the face photo sensor only deals with the night and with the day having strong sun light; not with the weather having dim light, cloudy weather, rainy weather, etc. Hence, the prior art does not fulfill users' requests on actual use.

SUMMARY OF THE INVENTION

The main purpose of the present invention is to use a photo sensor having a transparent hole and a shade pole to obtain a precise sensing at east/west and north/south and to obtain a high concentrating solar cell power efficiency by providing a simulated global irradiance and a direct normal insolation for different weathers.

To achieve the above purpose, the present invention is a hybrid mode sun-tracking apparatus having a photo sensor, comprising a photo sensor and a hybrid mode sun-tracking apparatus, where the photo sensor comprises a semi-sphere transparent dome, a shade pole, a substrate, a PCB and a bottom; and the hybrid mode sun-tracking apparatus comprises an analog signal processing unit, a micro process or unit and a current drive circuit unit, where sun position is precisely tracked and different tracking modes are used for different weathers to obtain a high concentrating solar cell power efficiency. Accordingly, a novel hybrid mode sun-tracking apparatus having a photo sensor is obtained.

BRIEF DESCRIPTIONS OF THE DRAWINGS

The present invention will be better understood from the following detailed description of the preferred embodiment according to the present invention, taken in con junction with the accompanying drawings, in which FIG. 1 is the explosive views showing the photo sensor of the preferred embodiment according to the present invention;

DESCRIPTION OF THE PREFERRED EMBODIMENT

The following description of the preferred embodiment is provided to understand the features and the structures of the present invention.

Figure 1:
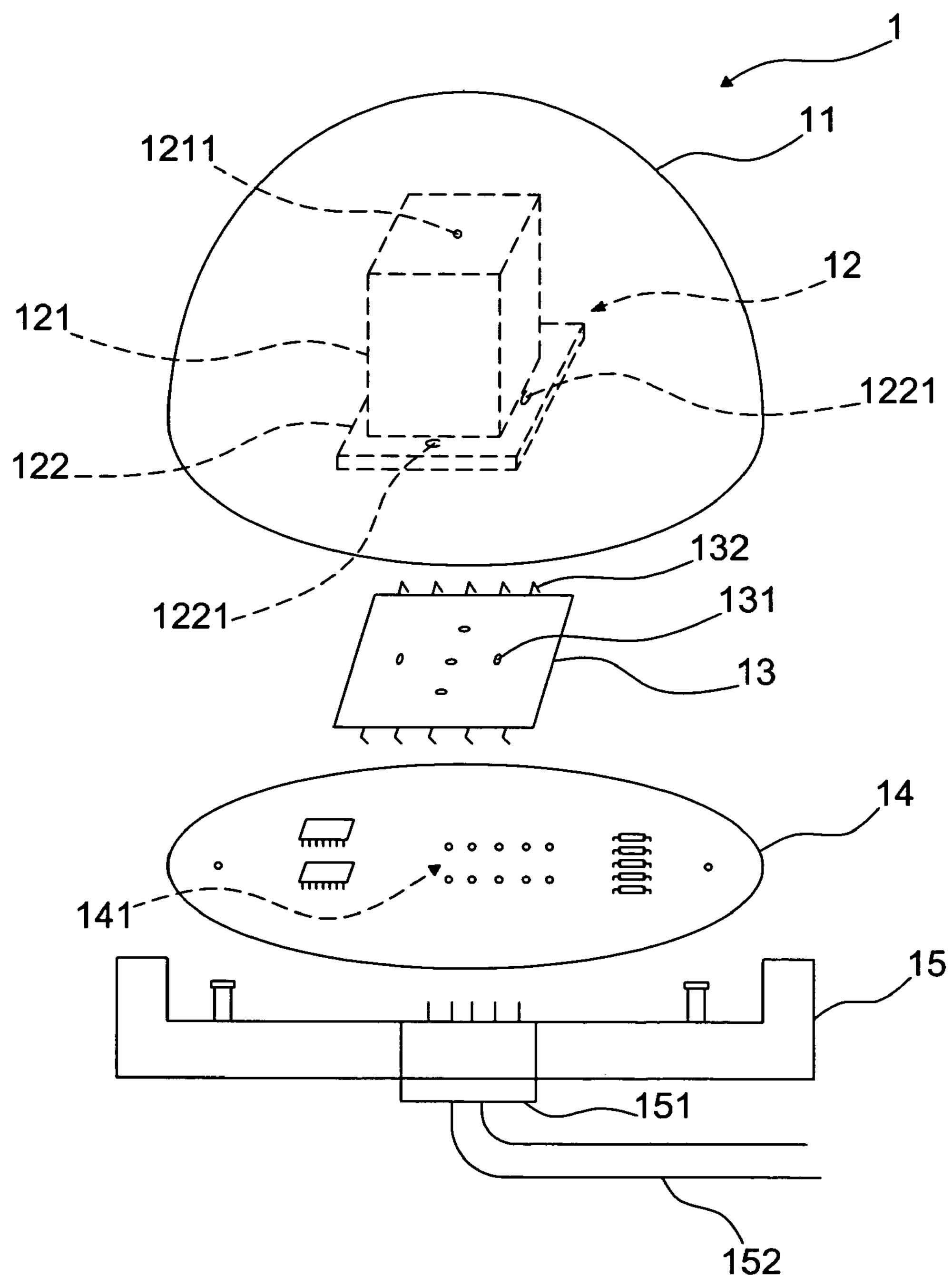
Figure 2:
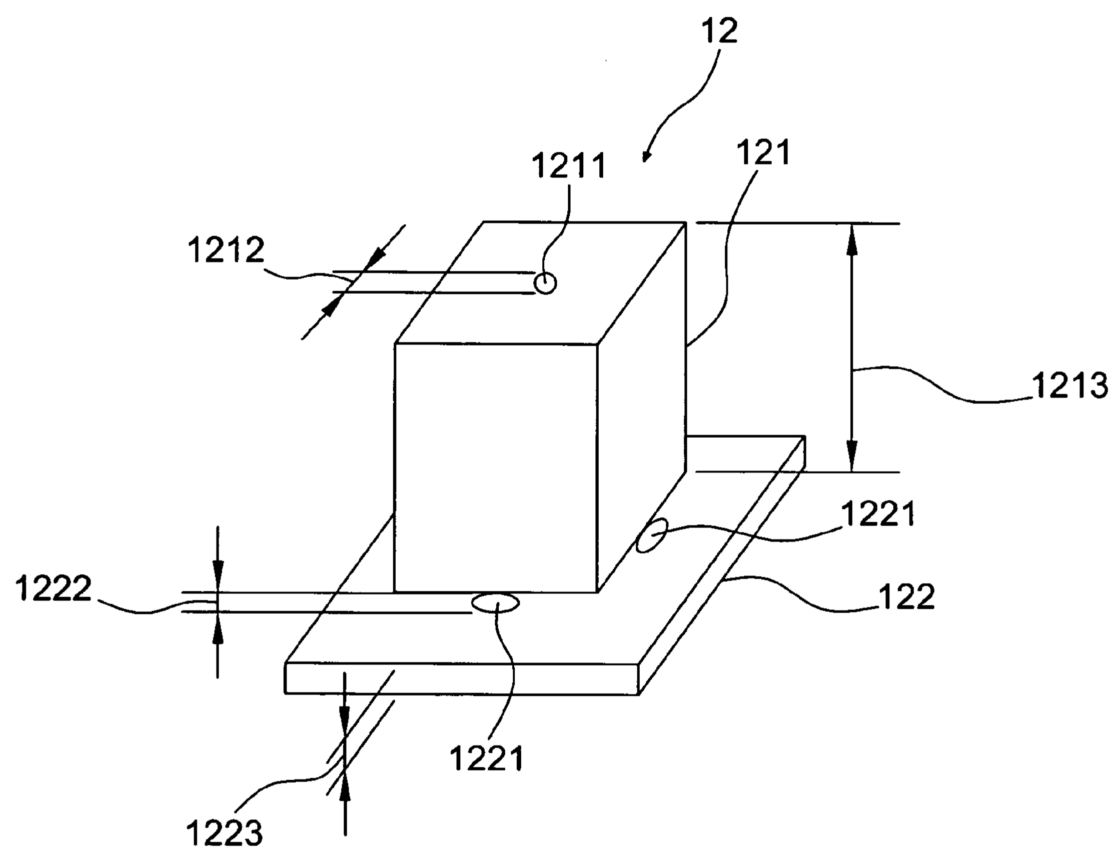
FIG. 2 is the perspective view showing the shade pole.
Figure 3:
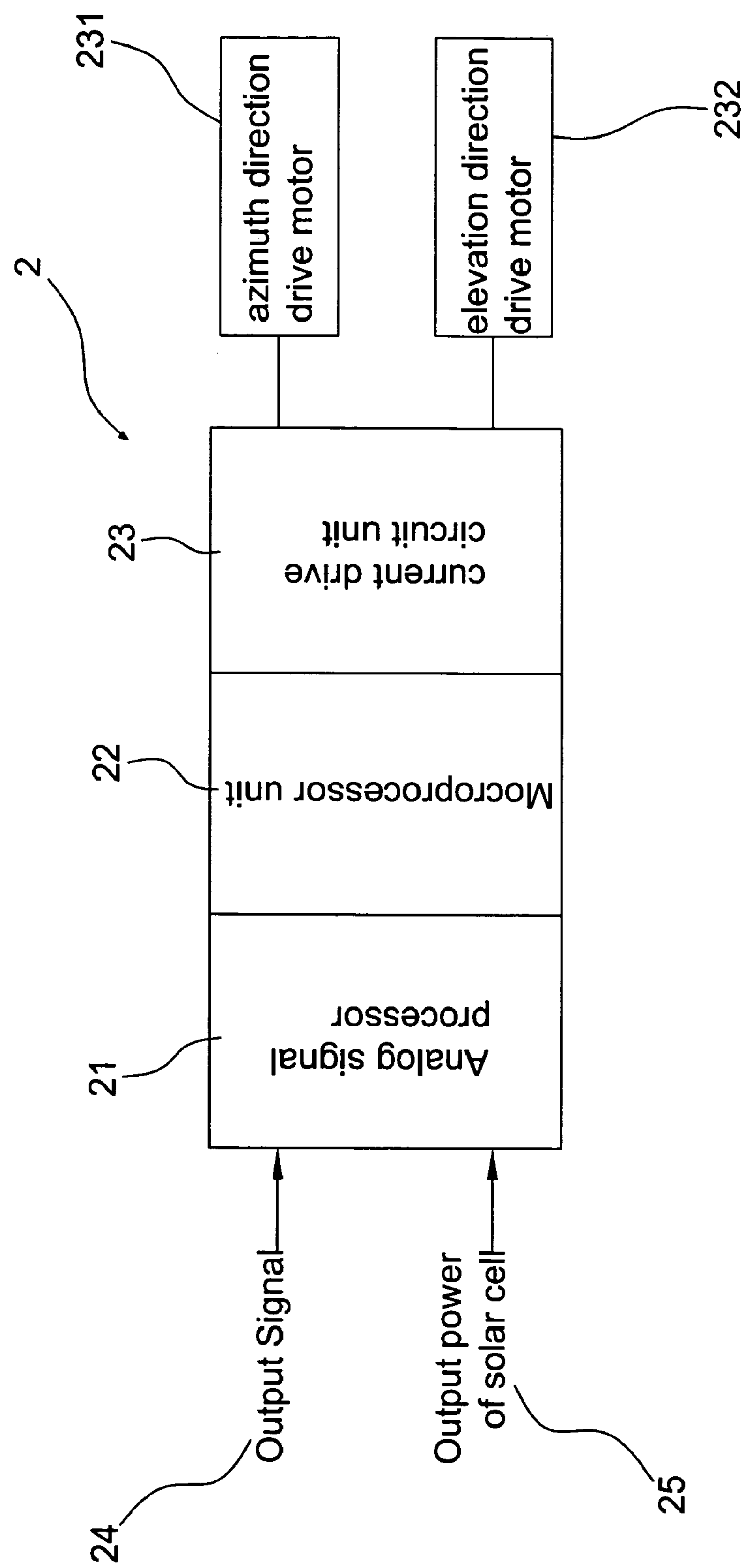
FIG. 3 is the view showing the state of use.

Please refer to FIG. 1 to FIG. 3, which are an explosive view showing a photo sensor, a perspective view showing a shade pole, and a view showing a state of use of a preferred embodiment according to the present invention. As shown in the figures, the present invention is a hybrid mode sun-tracking apparatus having a photo sensor, comprising a photo sensor [1] and a hybrid mode sun-tracking apparatus [2], where the photo sensor [1] comprises a semi-sphere transparent dome [11], a shade pole [12], a substrate [13], a printed circuit board (PCB) [14] and a bottom [15]; and the hybrid mode sun-tracking apparatus [2] comprises an analog signal processing unit [21], a microprocessor unit [22] and a current drive circuit unit [23].

The semi-sphere transparent dome [11] is waterproof, moisture-proof and crash proof; the bottom [15] is made of an aluminum alloy; and the above two components protects the sensor within.

The shade pole [12] comprises a first square pillar [121] and a second square pillar [122], where a pole [1211] with a first transparent hole is located at center of the first square pillar [121]; the second square pillar [122] has four second transparent holes [1221] separately located at center of edge lines of four side surfaces of the first square pillar [121]; the aperture [1222] of the second transparent hole [1221] has a ratio smaller than 0.5 to a height [1212] of the first square pillar [121]; the aperture [1222] of the second transparent hole [1221] has a ratio greater than 1 to a height [1223] of the second square pillar [122]; the shade pole [12] has the pole [1211] with the first transparent hole to be a photo collimator; and a ratio of an aperture [1213] of the pole [1211] with the first transparent hole to height of the shade pole [12] is smaller than 0.02 so that sun light is able to shine to the bottom only when the position of the sun has a deviation to center smaller than 1.15 degrees of angle.

The substrate [13] has photo sensing diodes [131] at east direction, west direction, north direction, south direction and center. The substrate [13] has five pins [132] at each side of two opposite sides; and the five photo sensing diodes [131] connect their anodes and cathodes to the ten pins separately; the second transparent holes [1221] of the second square pillar [122] and the first transparent holes [1211] of the first square pillar [121] are separately corresponding to the photo sensing diodes [131] at the east direction the west direction the north direction, the south direction and the center; and a filter glue is filled in the shade pole [12] from the pole [1211] with the first transparent hole to obtain a whole component with the substrate [13] through a packaging process Then the above whole component (the shade pole [12] together with the substrate [13]) is put on the PCB [14] to parallel the PCB [14] and the bottom [15]; the PCB [14] comprises a passive device and a power converter device and is connected with the substrate [13]; and the PCB [14] has a first connecting member [141] to connect to a second connecting member [151] of the bottom [15].

The second connecting member [151] of the bottom [15] connects to the hybrid mode sun-tracking apparatus [2] through a conducting wire [152]. The hybrid mode sun-tracking apparatus [2] receives output signals [24] of the photo sensing diodes [131] located at east, west, north, south and center of the substrate [13]. The analog signal processing unit [21] comprising differential amplifiers processes output signals transmitted by the photo sensor [1] to filter out noise in the output signal [24], to match impedance, to ad just difference value of east/west and north/south signal and to handle output power of solar cell [25].

The microprocessor unit [22] processes a control to a hybrid mode sun-tracking comprising a photo sensor tracking mode and a maximum power tracking mode to be used under different weathers to obtain a maximum power output of a concentrating solar cell.

The current drive circuit unit [23] is connected to an azimuth direction drive motor [231] and an elevation direction drive motor [232], where the motors [231, 232] are driven with high current to turn or turn over.

Figure 4:
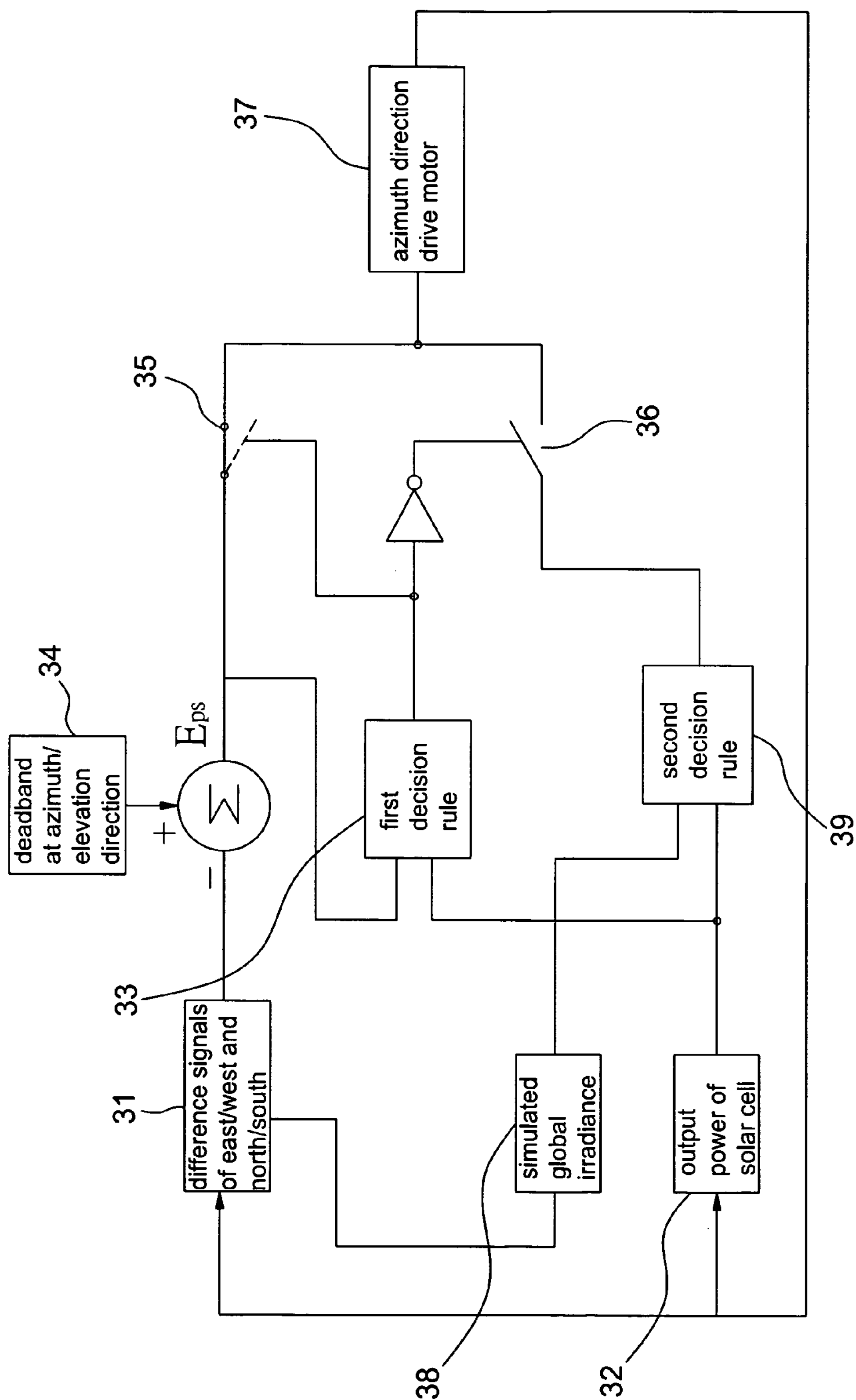
FIG. 4 is the view showing the state of control.
Figure 5:
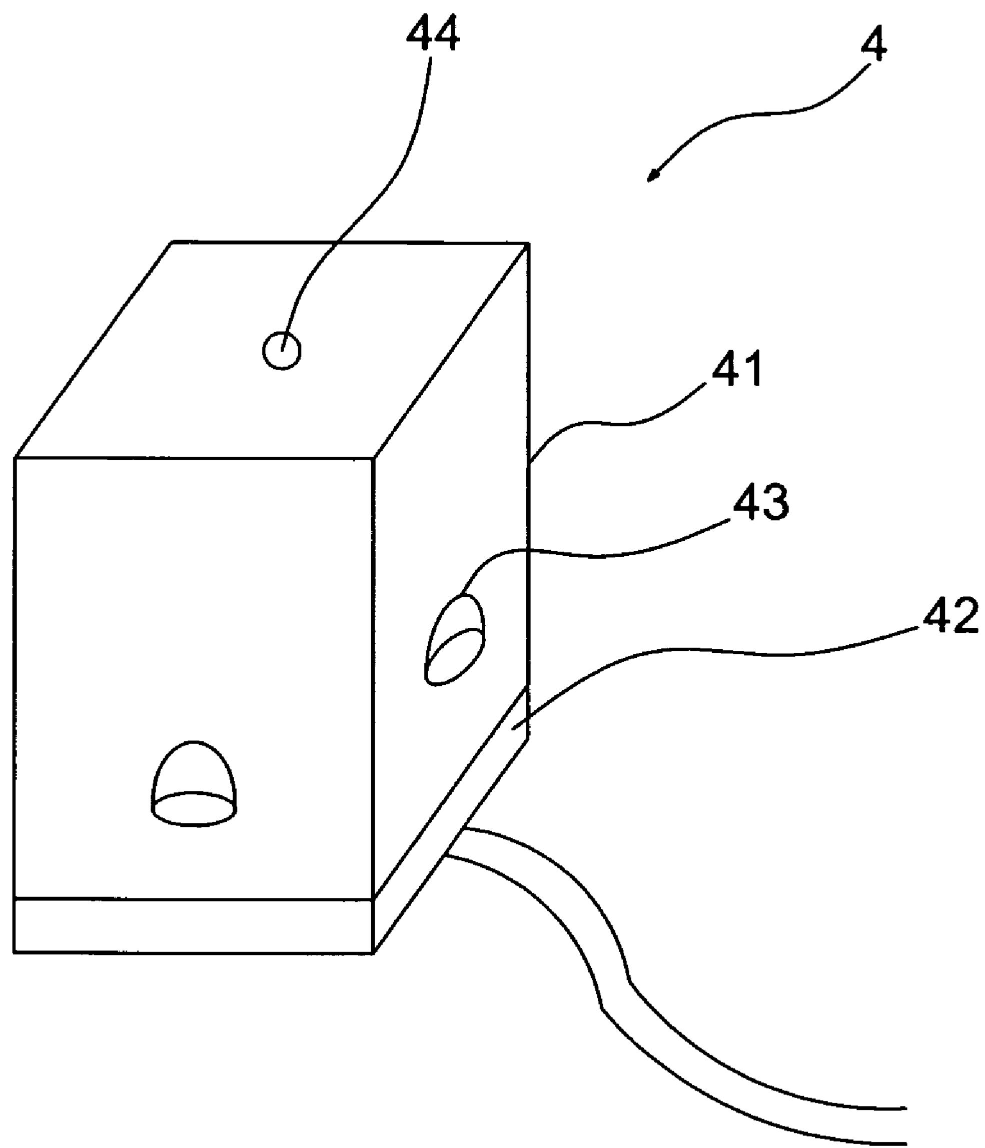
FIG. 5 is the view of the photo sensor of the prior art.

Please refer to FIG. 4, which is a view showing a state of control. As shown in the figure, a microprocessor unit [22] of a hybrid mode sun-tracking apparatus processes a hybrid mode sun-tracking, where difference signals of east/west and north/south [31] and output power of solar cell [32] transmitted by an analog signal processing unit are received and are analyzed with a first decision rule [33]. The first decision rule [33] is to find out whether a difference between the difference signal of east/west and north/south and dead band at azimuth/elevation direction is not zero, or whether an output power of a solar cell is smaller than 1 watt (W). When a ‘Yes’ answer is found to the first decision rule [33], the first switch [35] is closed and the second switch [36] is opened to process the photo sensor tracking mode. At this moment, a difference obtained from a comparison between the difference signal of east/west and north/south [31] and deadband at azimuth/elevation direction [34] is not zero and then the azimuth direction drive motor [37] is turned until the difference is zero. The sun-tracking starts from azimuth direction; and, when the sun-tracking reaches deadband at the azimuth direction, elevation direction continues. If the sun-tracking at the elevation direction does not reaches deadband at the elevation direction yet the sun-tracking moves out of the dead band at the azimuth direction, the sun-tracking starts from the azimuth direction and then the elevation direction again. Later, the sun-tracking reaches the deadband at the azimuth direction and the deadband at the elevation direction and difference of east/west and north/south [31] is zero. Then, if the output power of solar cell is smaller than 1 W, the weather has a diffuse light and the photo sensor tracking mode continues. Otherwise, if the output power of solar cell is not smaller than 1 W, the solar cell has a certain power output. Then the first switch [35] is opened, and the second switch [36] is closed and the tracking mode is switched to the maximum power tracking mode.

The maximum power tracking mode is based on a ratio of the output power of the solar cell [32] to a simulated global irradiance (Im) [38]. The tracking in the maximum power tracking mode is a step process toward west direction then north direction then south direction for a second decision rule [39]. The second decision rule [39] is to find whether the ratio of the output power of the solar cell to the simulated global irradiance is the maximum value. When a ‘Yes’ is found to the second decision rule [39], the output power of solar cell [32] has the maximum value and the solar cell is exactly right facing the sun. When the output power of the solar cell becomes smaller than 1 W, the weather is cloudy. Then the first switch [35] is closed and the second switch [36] is opened to process the photo sensor tracking mode. At this moment, if there is no power output from the solar cell, the photo sensor tracking mode is stopped. When the sun light shines on the ground again, the photo sensing diodes at the east, the west, the north and the south senses sun light; and photo sensor tracking mode starts tracking the azimuth direction and then the elevation direction again.

To sum up, the present invention is a hybrid mode sun-tracking apparatus having a photo sensor, where low cost, low electricity consumption, high stability and high precision are obtained, The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A hybrid mode sun-tracking apparatus comprising:

a photo sensor, said photo sensor comprising a semi-sphere transparent dome, a substrate, a printed circuit board (PCB), and a bottom; and a hybrid mode sun-tracking unit, said hybrid mode sun-tracking unit comprising an analog signal processing unit, a microprocessor unit and a current drive circuit unit, wherein said apparatus further comprising a shade pole including a first square pillar and a second square pillar;

wherein a pole with a first transparent hole is located at center of said first square pillar;

wherein said pole with a first transparent hole penetrates through said second square pillar:

wherein said second square pillar has four second transparent holes on a surface connecting to said first square pillar and said four second transparent holes are separately located at center of edge line soft our side surfaces of said first square pillar.

2. The sun-tracking apparatus according to claim 1, wherein an aperture of said pole with said first transparent hole has a ratio smaller than 0.02 to a height of said shade pole.

3. The sun-tracking apparatus according to claim 1, wherein an aperture of said second transparent hole has a ratio smaller than 0.5 to a height of said first square pillar.

4. The sun-tracking apparatus according to claim 1, wherein an aperture of said second transparent hole has a ratio greater than 1 to a height of said second square pillar.

5. The sun-tracking apparatus according to claim 1, wherein said substrate has five photo sensing diodes separately located at east, west, north, south and center of said substrate;

wherein said photo sensing diodes are separately corresponding to said first transparent hole of said first square pillar and said second transparent holes of said second square pillar; wherein each of two opposite sides of said substrate has five pins; and wherein anodes and cathodes of said photo sensing diodes are separately connected with said pins at said two opposite sides of said substrate.

6. The sun-tracking apparatus according to claim 1, wherein a filter glue is filled in said shade pole from said pole with said first transparent hole to obtain a whole component with said substrate through a packaging process.

7. The sun-tracking apparatus according to claim 1, wherein said PCB comprises a passive device, a power converter device and a first connecting member.

8. The sun-tracking apparatus according to claim 1, wherein said bottom is made of an aluminum alloy.

9. The sun-tracking apparatus according to claim 1, wherein said bottom has a second connecting member.

10. The sun-tracking apparatus according to claim 1, wherein said current drive circuit unit is connected with an azimuth direction drive motor and an elevation direction drive motor.

11. The sun-tracking apparatus according to claim 1, wherein said analog signal processing unit comprises differential amplifiers.

12. A hybrid mode sun-tracking apparatus comprising:

a photo sensor, said photo sensor comprising a semi-sphere transparent dome, a substrate, a printed circuit board (PCB), and a bottom; and a hybrid mode sun-tracking unit, said hybrid mode sun-tracking unit comprising an analog signal processing unit, a microprocessor unit and a current drive circuit unit, wherein said sun-tracking apparatus has a photo sensor tracking mode and a maximum power tracking mode, wherein said photo sensor tracking mode is processed and a difference between difference signal of east/west and north/south and deadband at azimuth/elevation direction is not zero.

13. The sun-tracking apparatus according to claim 12, wherein said photo sensor tracking mode is processed and an output power of a solar cell is smaller than 1 watt.

14. The sun-tracking apparatus according to claim 12, wherein said photo sensor tracking mode processes an azimuth tracking with a comparison to a deadband at azimuth/elevation direction, and a difference is outputted from said comparison to drive an azimuth direction drive motor until said difference is zero, and then an elevation direction is tracked.

15. The sun-tracking apparatus according to claim 12, wherein said maximum power tracking mode is processed and an output power of a solar cell is not smaller than 1 watt.

16. The sun-tracking apparatus according to claim 12, wherein a tracking base for said maximum power tracking mode is a ratio of an output power of a solar cell to a simulated global irradiance.

* * * * *